United States Patent
Liu et al.

(10) Patent No.: US 11,429,497 B2
(45) Date of Patent: Aug. 30, 2022

(54) PREDICTING AND HANDLING OF SLOW DISK

(71) Applicant: EMC IP Holding Company LLC, Hopkinton, MA (US)

(72) Inventors: Bing Liu, Tianjin (CN); Lingdong Weng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 232 days.

(21) Appl. No.: 16/697,260

(22) Filed: Nov. 27, 2019

(65) Prior Publication Data

US 2020/0327020 A1 Oct. 15, 2020

(30) Foreign Application Priority Data

Apr. 10, 2019 (CN) .......................... 201910284704.9

(51) Int. Cl.
| | |
|---|---|
| *G06F 11/14* | (2006.01) |
| *G06F 11/07* | (2006.01) |
| *G06N 20/00* | (2019.01) |
| *G06F 11/30* | (2006.01) |
| *G06F 3/06* | (2006.01) |
| *G06F 11/10* | (2006.01) |

(52) U.S. Cl.
CPC ........ *G06F 11/1471* (2013.01); *G06F 3/0619* (2013.01); *G06F 3/0653* (2013.01); *G06F 3/0673* (2013.01); *G06F 11/076* (2013.01); *G06F 11/0757* (2013.01); *G06F 11/0772* (2013.01); *G06F 11/1092* (2013.01); *G06F 11/3034* (2013.01); *G06N 20/00* (2019.01)

(58) Field of Classification Search
CPC .. G06F 11/1471; G06F 3/0619; G06F 3/0653; G06F 3/0673; G06F 11/0757; G06F 11/076; G06F 11/0772; G06F 11/1092; G06F 11/3034; G06F 11/008; G06F 11/0727; G06F 11/0787; G06N 20/00; G06N 5/003; G06N 20/20
See application file for complete search history.

(56) References Cited

U.S. PATENT DOCUMENTS

| | | | |
|---|---|---|---|
| 7,389,396 B1* | 6/2008 | Goel | G06F 11/0727 711/112 |
| 2014/0053014 A1* | 2/2014 | MacQuarrie | G06F 11/0793 714/4.2 |
| 2016/0092813 A1* | 3/2016 | Baker | G06Q 10/06313 705/7.23 |
| 2018/0157438 A1* | 6/2018 | Zhang | G06F 3/0604 |

\* cited by examiner

*Primary Examiner* — Masud K Khan
(74) *Attorney, Agent, or Firm* — Chamberlain, Hrdlicka, White, Williams & Aughtry (57) ABSTRACT

Embodiments of the present disclosure provide a computer-implemented method, an electronic device and a computer program product. The method comprises: obtaining historical data of recoverable errors that occurred in a storage disk during a first period in the past. The method also comprises: determining, based on the historical data, a predicted number of recoverable errors to occur in the storage disk during a second period. The first period has a same duration as that of the second period. The method further comprises: in response to the predicted number exceeding a threshold for identifying a slow disk, performing an operation for handling a slow disk on the storage disk.

18 Claims, 6 Drawing Sheets

PREDICTING AND HANDLING OF SLOW DISK

CROSS-REFERENCE TO RELATED APPLICATIONS

This application claims benefit to Chinese Patent Application 2019/0284704.9 filed on Apr. 10, 2019. Chinese Patent Application 2019/0284704.9 is hereby incorporated by reference in its entirety.

FIELD

Embodiments of the present disclosure generally relate to the field of computer system or storage system, and more specifically, to a method, an electronic device and a computer program product for prediction and handling slow disks.

BACKGROUND

In a storage system, a slow storage disk (or simply a slow disk) generally refers to a storage disk whose storage performance drops below a predetermined performance threshold, but is still able to store data. For example, latency of an input/output (I/O) response of a storage disk is longer than a threshold latency, but I/O operations may still be performed correctly. In many cases, a slow disk will result in a poor user experience. For example, because the latency of an I/O response of a slow disk is long, a storing command from a user cannot be returned in time. In addition, an error may occur in some applications if they are unable to get an I/O response within a predetermined time window.

In the industry of storage systems, most of failure prediction mechanisms for a storage disk are used to predict a bad storage disk without focusing on issues of a slow disk. In other word, traditional prediction mechanisms are designed for a "fail-stop" model, and there are no prediction and processing mechanisms for slow disks.

SUMMARY

Embodiments of the present disclosure relate to a method, an electronic device and a computer program product for prediction and handling slow disks.

In a first aspect of the present disclosure, there is provided a computer-implemented method. The method comprises obtaining historical data of recoverable errors occurred in a storage disk during a first period in the past. The method also comprises determining, based on the historical data, a predicted number of recoverable errors to occur in the storage disk during a second period in the future. The first period has a same duration as that of the second period. The method further comprises: in response to the predicted number exceeding a threshold for identifying a slow disk, performing an operation for handling a slow disk on the storage disk.

In a second aspect of the present disclosure, there is provided an electronic device. The electronic device comprises at least one processor and at least one memory storing computer program instructions. The at least one memory and the computer program instructions are configured, with the at least one processor, to cause the electronic device to: obtain historical data of recoverable errors occurred in a storage disk during a first period in the past. The at least one memory and the computer program instructions are also configured, with the at least one processor, to cause the electronic device to: determine, based on the historical data, a predicted number of recoverable errors to occur in the storage disk during a second period in the future. The first period has a same duration as that of the second period. The at least one memory and the computer program instructions are further configured, with the at least one processor, to cause the electronic device to: in response to the predicted number exceeding a threshold for identifying a slow disk, perform an operation for handling a slow disk on the storage disk.

In a third aspect of the present disclosure, there is provided a computer program product. The computer program product is tangibly stored on a non-volatile computer-readable medium and comprises machine-executable instructions. The machine-executable instructions, when being executed, cause a machine to perform steps of the method of the first aspect of the present disclosure.

It is to be understood that the contents described in the summary are not intended to define key or essential features of embodiments of the present disclosure nor intended to limit the scope of the present disclosure. Other features of the present disclosure will be readily understood through the following description.

BRIEF DESCRIPTION OF THE DRAWINGS

Through the following detailed description with reference to the accompanying drawings, the above and other objectives, features, and advantages of embodiments of the present disclosure will become more apparent. Several embodiments of the present disclosure are illustrated by way of example but not limitation in the drawings in which.

Throughout the drawings, the same or similar reference numerals are used to denote the same or similar components.

DETAILED DESCRIPTION OF EMBODIMENTS

Principles and spirit of the present disclosure will now be described below with reference to several example embodiments illustrated in the drawings. It should be appreciated that description of those particular embodiments is merely to enable those skilled in the art to better understand and implement the present disclosure and is not intended for limiting the scope of the present disclosure in any manner.

Figure 1:
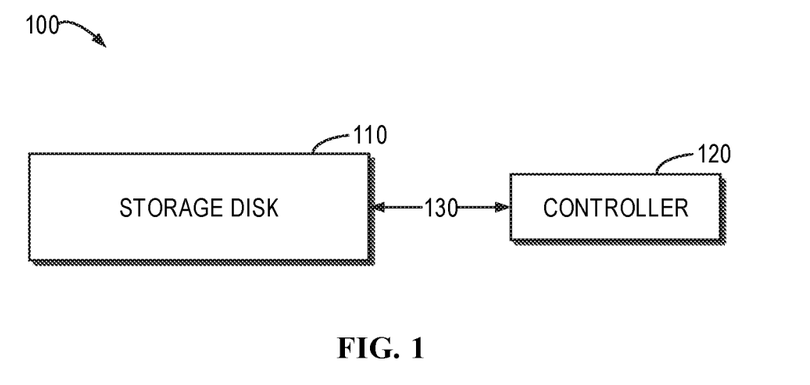
FIG. 1 shows a schematic diagram illustrating an example storage system in which embodiments of the present disclosure may be implemented.

FIG. 1 shows a schematic diagram illustrating an example storage system 100 in which embodiments of the present disclosure may be implemented. As shown in FIG. 1, the storage system 100 includes a storage disk 110 and a controller 120. The storage disk 110 and the controller 120 can communicate via a communication link 130. For example, the controller 120 may obtain various information of the storage disk 110 via the communication link 130, such as configuration information, runtime statistics, and event logs of the storage disk 110. Additionally or alternatively, the controller 120 may also obtain information related to the storage disk 110 from other units or components (not shown) of the storage system 100.

On the other hand, the controller 120 can also transmit control signals to the storage disk 110 via the communication link 130 to implement various controls, management, and operations on the storage disk 110. Additionally or alternatively, the controller 120 can be simultaneously connected to and control other storage disks (not shown) that operate cooperatively with the storage disk 110, such as other storage disks in the same redundant array of independent disks (RAID) as the storage disk 110. It will be appreciated that although FIG. 1 depicts the controller 120 as being external to the storage disk 110, in some embodiments, the controller 120 may be included in the storage disk 110 as an integral part thereof.

In some embodiments, the storage disk 110 may include various types of devices with storage functions including but not limited to, a hard disk (HDD), a solid state disk (SSD), a removable disk, a compact disk (CD), a laser disk, an optical disk, a digital versatile disk (DVD), a floppy disk, a Blu-ray disk, a serial attached small computer system interface (SCSI) storage disk (SAS), a serial advanced technology attached (SATA) storage disk, any other magnetic storage devices and any other optical storage devices, or any combination thereof.

Similarly, the controller 120 can include any device that implements control functions including but not limited to, a special purpose computer, a general purpose computer, a general purpose processor, a microprocessor, a microcontroller, or a state machine. The controller 120 can also be implemented as an individual computing device or a combination of computing devices, such as a combination of a DSP and a microprocessor, a plurality of microprocessors, one or more microprocessors in conjunction with a DSP core, or any other such configuration.

In addition, the communication link 130 can be a connection or coupling in any form that implement a communication between the storage disk 110 and the controller 120, including but not limited to, a coaxial cable, a fiber optic cable, a twisted pair, or a wireless technology (such as infrared, radio and microwave). In some embodiments, the communication link 130 can include various types of buses.

It should be understood that FIG. 1 only schematically illustrates units, modules or components in the storage system 100 that are related to embodiments of the present disclosure. In practice, the storage system 100 may also include other units, modules, or components for other functions. Thus, embodiments of the present disclosure are not limited to the specific devices, units, modules or components depicted in FIG. 1, but are generally applicable to any storage system including storage disks and controllers.

As mentioned above, in the industry of storage systems, most of failure prediction mechanisms for a storage disk are used to predict a bad storage disk without focusing on issues of a slow disk. There are some problems with such a traditional approach.

First, the traditional approach is passive rather than proactive, which cannot recognize slow disks in advance and can be performed only offline, and thereby resulting in a poor user experience. Second, the traditional approach does not have a systematic framework for intelligently handling slow disk problems, such as how to predict slow disks and whether to stop slow disks or perform other operations, and so on.

Regarding the problems related to a slow disk, the inventors of the present disclosure have found through research that I/O errors occur as storage media of the storage disk wear out. Some of these I/O errors can be recovered by internal logic of the storage disk (for example, sector remapping, internal retries, fault-tolerant coding, or the like). However, such recovery processing also introduces additional I/O latency. As more and more recoverable errors occur, the storage disk become slower and slower, eventually resulting in an unfriendly I/O response. Therefore, the problems regarding a slow disk are closely related to increasing recoverable errors. That is, a slow disk is tightly related to the number of recoverable errors occurred in it.

In view of the above problems and other potential problems in the conventional solutions, and through the above research and findings of the inventors, embodiments of the present disclosure propose a method, an electronic device, and a computer program product for prediction and handling a slow disk. The various embodiments of the present disclosure determine, from historical data of recoverable errors occurred in the storage disk, an association between the number of recoverable errors to occur in the future and the historical data, and then predict whether the storage disk is to become a slow disk in a future time based on the association. If it is predicted that the storage disk is to become a slow disk, a corresponding operation of handling the slow disk is performed. In some embodiments, the above association may be represented by a trained machine learning model. For example, various machine learning models can be used to learn the above association from the historical data.

Embodiments of the present disclosure may accurately predict whether a storage disk is to become a slow disk in a future time (for example, one week later), and thus proactive countermeasures can be taken. For example, if it is predicted that the storage disk is to become a slow disk, the storage system may adopt different strategies to handle the storage disk, thereby improving the performance of the storage system to which the storage disk belongs. In some embodiments, embodiments of the present disclosure use a random forest regression model to learn the historical data of the storage disk and predict a slow disk. Simulations show that the random forest regression model can achieve more accurate predictions than other machine learning models (for example, various classification models). Embodiments of the present disclosure are described in detail below with reference to FIGS. 2-6.

Figure 2:
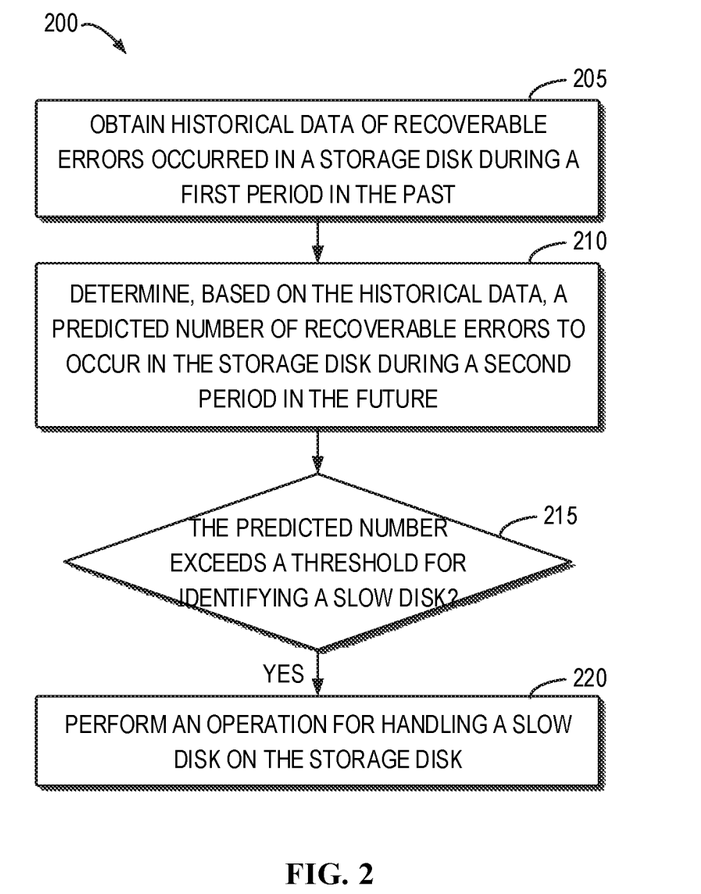
FIG. 2 shows a schematic flow chart of a method for prediction and handling slow disks in accordance with an embodiment of the present disclosure.

FIG. 2 shows a schematic flow chart of a method 200 for prediction and handling a slow disk in accordance with an embodiment of the present disclosure. In some embodiments, the method 200 may be implemented by the controller 120 in the storage system 100, such as by a processor or a processing unit of the controller 120, or by various functional modules of the controller 120. In other embodiments, the method 200 can be implemented by a computing device independent of the storage system 100, or can be implemented by other units or modules in the storage system 100. For ease of discussion, the method 200 will be discussed below with reference to FIG. 1.

At 205, the controller 120 obtains historical data of recoverable errors occurred in the storage disk 110 during a first period in the past. In the context of the present disclosure, a recoverable error generally refers to any error that causes a storage disk to become a slow disk. In other words, the recoverable errors can include various errors related to the storage disk 110, and embodiments of the present disclosure are not limited to any particular error. As an example, a "reallocated sector" error or a "recovered error" in the Self-Monitoring Analysis and Reporting Technology (SMART) statistics or Background Media Scan (BMS) statistics are recoverable errors.

Thus, in some embodiments, the controller 120 may obtain historical data for a particular recoverable error and then predict whether the storage disk 110 is to become a slow disk for that particular recoverable error. Alternatively, the controller 120 may obtain historical data for a plurality of kinds of recoverable errors simultaneously, and then predict whether the storage disk 110 is to become a slow disk for these kinds of recoverable errors. Moreover, the controller 120 can obtain historical data of all available recoverable errors concurrently, and then predict whether the storage disk 110 is to become a slow disk for all the recoverable errors.

In addition, the first period related to the historical data obtained by the controller 120 may be a period with any suitable duration. For example, the first period may be one day, that is, the controller 120 may obtain historical data of recoverable errors occurred in the storage disk 110 during a day in the past. In other embodiments, the first period may be reasonably set to other durations, such as one hour, three hours, five hours, ten hours, three days, five days, ten days, one month, and the like. This can be determined by the administrator or user of the storage system 100 based on the specific technical environment and design requirements.

The controller 120 can obtain the above historical data in any suitable manners. For example, the controller 120 can directly record the above historical data during the operation of the storage disk 110. However, in some embodiments, the controller 120 may utilize the daily recorded information about the storage disk 110 to obtain the historical data. For example, the controller 120 may obtain raw data including configuration information, runtime statistics, and event logs of the storage disk 110. The raw data can be downloaded from a database that records relevant information of the storage disk 110, such as an Automatic Support (ASUP) database, which operates like a daily store. In practice, relevant personnel can parse and format the raw data of the ASUP database to form a daily snapshot of the storage system 100 in a structured database consisting of a large number of database tables. Therefore, the controller 120 can utilize such a structured database to obtain the above historical data.

For predicting whether the storage disk 110 is to become a slow disk, several database tables related to the storage disk 110 are of interest. After connecting to these database tables inline, the controller 120 can obtain various attributes of the storage disk 110, including the serial number, the vendor, and the model/type (such as SAS, SATA, SSD, HDD, or the like) of the storage disk 110, SMART statistics, BMS statistics (SAS storage disks only), recorded timestamps, and health/failure tags, and so on.

However, the raw data obtained by the controller 120 is generally not well formatted and may contain a lot of noise information. Therefore, in order to accurately predict future information of the storage disk 110, the controller 120 may preprocess the obtained raw data to extract necessary useful historical data therefrom. For example, such pre-processing may include information extraction, formatting, filtering, filling missing values, and the like related to the raw data.

Specifically, it is assumed that the controller 120 needs to predict the number of specific recoverable errors E to occur in the storage disk 110 after n days (n is a natural number). First, the controller 120 may extract useful information from the raw data, which may include the number of errors E, the serial number of the storage disk, timestamps, SMART statistics, BMS statistics, or the like. For ease of description, information in a row related to a storage disk at a certain timestamp may be referred to as an "example," and the set of all examples with the same serial number (namely, the same storage disk) may be termed as "a storage disk group."

Next, the controller 120 can format the extracted information. As described above, the extracted information contains rows of examples, where each row of an example indicates the state of a storage disk at a certain timestamp. The controller 120 may group the rows of examples according to their serial numbers, so that each storage disk group contains information of the storage disk with the same serial number. Then, within each storage disk group, the controller 120 may sort the examples according to their timestamps. In this way, the controller 120 can obtain storage disk groups, and in each storage disk group, examples are sorted from the first day to the last day.

Next, the controller 120 can filter the formatted information. In some cases, many examples from the raw data contain attributes of empty values. Thus, the controller 120 can filter out examples in which the number of attributes of empty values exceeds a certain proportion (for example, 50%). On the other hand, the controller 120 can delete examples where the number of errors E is null, as these examples may be useless for predicting the number of errors E.

Then, the controller 120 may perform filling of missing values on the filtered information. In particular, the controller 120 may fill empty values in an example with an acceptable number of empty values (missing values) with a particular value (for example, −999). After the above pre-processing on the raw data, the controller 120 can obtain the historical data of the recoverable errors occurred in the storage disk 110 during the first period in the past.

At 210, based on the obtained historical data of the recoverable errors occurred in the storage disk 110 during the first period in the past, the controller 120 determines a predicted number of recoverable errors to occur in the storage disk 110 during a second period in the future. The first period has the same duration as that of the second period. For example, in the case that the first period is one day, the second period is also one day. In other words, the controller 120 can predict the number of recoverable errors to occur during some day in the future, based on the number of recoverable errors occurred during some day in the past. As mentioned above, the first period can be reasonably set to other durations, and thus the duration of the second period may be set to other durations accordingly. In other embodiments, the first period can be determined based on the second period. For example, if it is desired to predict the related information of recoverable errors to occur in the storage disk 110 next week, that is, the second period is one week, then the first period may be determined to be one week accordingly.

It will be understood that the principle of predicting the number of recoverable errors to occur during a second period in the future based on the historical data of the recoverable errors occurred in the storage disk 110 during the first period in the past is that there are certain regularities for the numbers of the recoverable errors occurred in the storage disk 110 at different times. In some cases, this regularity may be simple. For example, the number of the recoverable errors occurred in the storage disk 110 may grow linearly over time, or may be determined by curve fitting. In these cases, the controller 120 may determine the predicted number from the number of the recoverable errors occurred in the storage disk 110 in the past by a simple manner such as linear function calculation, curve fitting, or the like.

However, in more cases, the temporal regularity of the number of the recoverable errors occurred in the storage disk 110 may be complicated and difficult to determine by simple mathematical calculations. Even so, the number of recoverable errors to occur in the storage disk 110 in the future still has some relevance to the behavior of the recoverable errors occurred in the storage disk 110 in the past. This relevance may be embodied as that there is an association between the number of recoverable errors to occur in the storage disk 110 in the future and various attributes related to the recoverable errors occurred in the storage disk 110 in the past.

In some embodiments, the above association may be determined based on historical data of the recoverable errors occurred in the storage disk 110 prior to the first period. Specifically, if the controller 120 needs to predict the number of recoverable errors to occur in the storage disk 110 after n days, based on the number of the recoverable errors occurred in the storage disk 110 on a certain day (assuming that the date is X), then the association as described above may be determined based on historical data of the recoverable errors occurred in the storage disk 110 before the date X. In this way, it is ensured that the historical data for determining the above association has a span of time greater than or equal to n, thereby facilitating more accurate determination of the association. However, it is understood that it is also feasible to use historical data after the date X to determine the association.

In some embodiments, to determine the above association, the controller 120 may first determine an attribute of the recoverable errors occurred in the storage disk 110 during the first period from the historical data. For example, the attribute may be the number of the recoverable errors occurred in the storage disk 110 during a period with the same duration. Specifically, if the number of recoverable errors to occur in the storage disk 110 in the future is to be predicted, the attribute may be the number of the recoverable errors occurred in some day in the past. That is, the number of recoverable errors to occur in the storage disk 110 in some day in the future has an association with the number of the recoverable errors occurred in the storage disk 110 in some day in the future.

As another example, the attribute can be a change rate of the number of the recoverable errors occurred within a predetermined time window. The predetermined time window can be set by the administrator or user of the storage system 100 as any suitable duration depending on the particular technical environment and design requirements, such as three days, five days, seven days, or the like. It can be understood that the number of recoverable errors to occur in the storage disk 110 during the second period in the future also has an association with the above change rate. As another example, the attribute can be a variance of the number of the recoverable errors occurred within the predetermined time window. It can be understood that the number of recoverable errors to occur in the storage disk 110 during the second period in the future also has an association with the variance. The various attributes listed above are closely related to the number of recoverable errors to occur in the storage disk 110 in the future in a comprehensible way, and thus using these attributes to determine the above association can improve the prediction accuracy.

In other embodiments, the above attributes may also include any attribute in the SMART statistics and the BMS statistics (such as, the temperature, the power-on duration, the total number of writes, or the like), because the number of recoverable errors to occur in the storage disk 110 during the second period in the future may have some association with these attributes. The attributes included in the SMART statistics and the BMS statistics are known and will not be enumerated herein. More generally, the above attributes may be any attributes known or to be discovered in the future, that are related to the recoverable errors occurred in the storage disk 110 during the first period. Further, the controller 120 may determine one or more attributes from the historical data, that is, the number of the attributes is configurable.

After determining the above attributes, the controller 120 may determine the predicted number based on the association between the predicted number of recoverable errors to occur in the storage disk 110 during the second period in the future and the determined attributes. For example, in the case that the temporal regularity of the number of the recoverable errors occurred in the storage disk 110 is relatively simple, the controller 120 may use a mathematical calculation to obtain the predicted number of recoverable errors to occur in the storage disk 110 during the second period in future, based on the attributes of the recoverable errors occurred in the storage disk 110 in the past, such as the number of the recoverable errors and the change rate of the number.

However, in more cases, the above regularity is not simple or clear. In such cases, a trained machine learning model can be used to represent the association between the predicted number and the above attributes. In this way, an association which is more complex or difficult to interpret can be learned and used for prediction, thereby improving the accuracy of the prediction. The training and testing processes of the machine learning model in the embodiments of the present disclosure are described below with reference to FIG. 3. It will be appreciated that in some embodiments, the training and testing processes of the machine learning model can be performed by the controller 120. In other embodiments, the training and testing processes of the machine learning model may be performed by any other computing device different from the controller 120, and the controller 120 may directly use the trained and tested machine learning model. Further, the training process and the testing process of the machine learning model can be completed on different computing devices.

Figure 3:
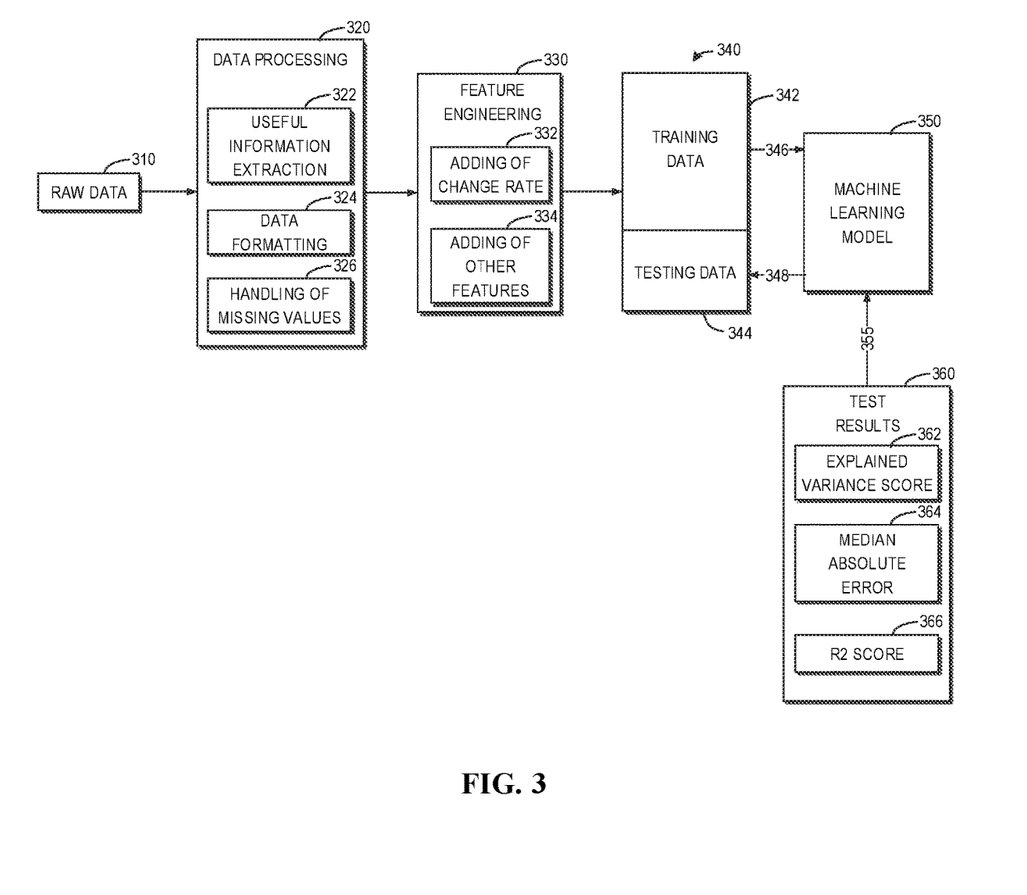
FIG. 3 shows a schematic diagram of training and testing of a machine learning model in accordance with an embodiment of the present disclosure.

FIG. 3 shows a schematic diagram of training and testing of a machine learning model 350 in accordance with an embodiment of the present disclosure. As shown in FIG. 3, the raw data 310 can be input to a data processing module 320. The data processing module 320 can perform a data processing progress similar to that described above for extracting the historical data from the raw data. For example, the data processing module 320 can include a useful information extracting module 322, a data formatting module 324 and a missing value processing module 326, and the like. The functions and purposes of these modules are similar to the various processes in the pre-processing for extracting the historical data from the raw data described above, and are not described herein again.

Figure 4:
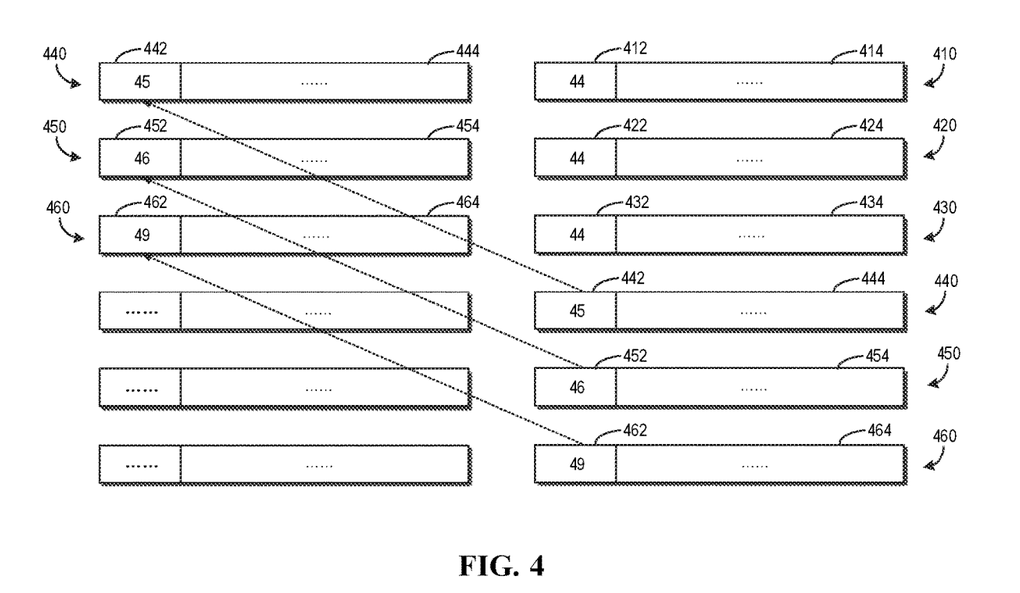
FIG. 4 shows a schematic diagram illustrating a process of labeling historical data in accordance with an embodiment of the present disclosure.

After the data processing module 320 completes the data processing of the raw data 310, the historical data may be labeled, and the labeling process is specifically described below with reference to FIG. 4. FIG. 4 shows a schematic diagram of a labeling process 400 of available historical data 340 in accordance with an embodiment of the present disclosure. In the machine learning, the so-called labeling process generally refers to the process of specifying output results to training samples. Thus, the labeling process 400 for the machine learning model 350 can be performed based on the distance in time between the second period in the future to be predicted and the first period in the past. For example, if it is desired to predict the number of recoverable errors to occur in the storage disk 110 after seven days, the labeling process 400 can be performed based on the seven-day duration.

As an example, a labeling process 400 based on a three-day duration is illustrated in FIG. 4, namely, the machine learning model 350 needs to be trained to predict the number of recoverable errors to occur in the storage disk 110 after three days. As shown in FIG. 4, historical data 410 recorded on the first day (assuming that the date is Y) may include the number 412 of the recoverable errors and other attribute information 414. Similarly, historical data 420 to 460 recorded on the second day (date Y+1) up to the sixth day (date Y+5) may include the numbers 422 to 462 of the recoverable errors and other attribute information 424 to 464.

In the example of FIG. 4, the number 412 of the recoverable errors occurred on the first day (date Y) is 44, the number 422 of the recoverable errors occurred on the second day (date Y+1) is 44, the number 432 of the recoverable errors occurred on the third day (date Y+2) is 44, the number 442 of the recoverable errors occurred on the fourth day (date Y+3) is 45, the number 452 of the recoverable errors occurred on the fifth day (date Y+4) is 46, and the number 462 of the recoverable errors occurred on the sixth day (date Y+5) is 49.

In the example of FIG. 4, since it is to predict the number of recoverable errors to occur three days later, the specified prediction result is the historical data 440 for the historical data 410. That is, the historical data 410 is labeled using historical data 440. Similarly, the historical data 450 and 460 are used to label the historical data 420 and 430, respectively. The historical data 440-460 can be labeled in the same manner.

Referring back to FIG. 3, after labeling the historical data, a feature engineering module 330 can perform feature engineering on the historical data. In feature engineering, the attributes as described above of the determined historical data for predicting the number of recoverable errors to occur in the storage disk 110 during the second period in the future may be the features to be learned by the machine learning model 350, for example, the number of the recoverable errors occurred in the storage disk 110 during a period with a particular duration, the change rate of the number within a predetermined time window, and the variance of the number within the predetermined time window.

In addition, all of the SMART attributes and the BMS attributes of the storage disk 110 can be used as the features to be learned by the machine learning model 350. Further, new features can be added in feature engineering for the machine learning model 350 to learn. For example, the variances and change rates of all attribute values can also be used as new features for the machine learning model 350 to learn. As an example, the change rate of the number of the recoverable errors E occurred in the storage disk 110 within n days can be expressed as follows using equation (1).

$$E_{change} = |E_i - E_{i-n}| \tag{1}$$

where $E_i$ is the number of the recoverable errors E on day i, and $E_{i-n}$ is the number of the recoverable errors E on n days before the day i.

Figure 5:
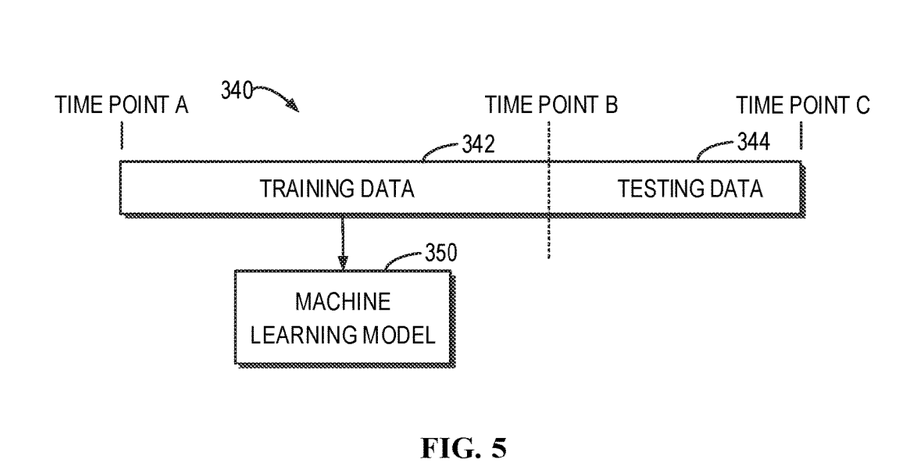
FIG. 5 shows a schematic diagram of dividing available historical data into training data and testing data in accordance with an embodiment of the present disclosure.

As shown in FIG. 3, after the feature engineering module 330 completes the feature engineering, the available historical data 340 can be divided into training data 342 and testing data 344 to train 346 and test 348 the machine learning model, respectively. FIG. 5 shows a schematic diagram of dividing the available historical data 340 into the training data 342 and the testing data 344, in accordance with an embodiment of the present disclosure. In the embodiment illustrated in FIG. 5, the historical data 340 may be divided into the training data 342 and the testing data 344 in an order of occurrence. For example, the training data 342 may be the historical data recorded from a time point A (for example, a first date) to a time point B (for example, a second date), while the testing data 344 may be the historical data recorded from the time point B (for example, the second date) to a time point C (for example, the third date).

Dividing the training data 342 and the testing data 344 in the chronological order may ensure the time coherence of the historical data for training and testing the machine learning model 350, which is beneficial for improving the training effect of the machine learning model 350. In other embodiments, the training data 342 and the testing data 344 may be divided on the time axis in other ways. For example, the training data 342 and the testing data 344 may be alternately distributed on the time axis. More generally, the training data 342 and the testing data 344 can be divided based on other parameters than the parameter of time or in any other manner, as long as the training data 342 can effectively be used to train the machine learning model 350, and the testing data 344 can effectively be used to test the machine learning model 350.

In some embodiments, in order for the machine learning model 350 to effectively predict a specific value of the number of recoverable errors to occur in the storage disk 110 during the second period in the future, a regression machine learning model may be used. On the other hand, it is known that the random forest classification model can achieve good prediction results in terms of bad disk prediction, and it is the most explainable machine learning model for such problems. Thus, embodiments of the present disclosure may use a random forest regression model as the machine learning model 350 for predicting the number of recoverable errors to occur in the storage disk 110 during the second period in the future.

Referring back to FIG. 3, a test result module 360 can measure the test results of the machine learning model 350 and adjust 355 the machine learning model 350. In terms of testing the model, the regression machine learning model has different performance metrics from the classification machine learning model, including the explained variance score, the median absolute error, and the R2 score, and so on. Thus, for the regression machine learning model 350, the test result module 360 can include an explained variance score module 362, a median absolute error module 364, and an R2 score module 366. The explained variance score measures the proportion to which a mathematical model accounts for the variation (dispersion) of a given data set, which can be defined using equation (2) as follows:

$$\text{Explained Variance Score}(Y, \hat{Y}) = 1 - \frac{\text{Var}(Y - \hat{Y})}{\text{Var}(Y)} \tag{2}$$

where $\hat{Y}$ is the set of predicted values and Y the set of true values, and the explained variance score closer to 1 means better performance of the regression model.

The median absolute error measures the median of absolute differences between true values and predicted values. This measurement may be of particularly of interest because it is very robust to outliers. The median absolute error can be expressed using equation (3) as follows:

$$\text{Med}AE(Y,\hat{Y}) = \text{median}(|y_1 - \hat{y}_1|, \ldots |y_c - \hat{y}_c|) \quad (3)$$

where $\hat{Y}$ is the set of predicted values and Y the set of true values.

The R2 score is a measure of how well observed outcomes are replicated by the model, based on the proportion of total variation of outcomes explained by the model. The R2 score can be expressed using equation (4) as follows:

$$R^2(Y,\hat{Y}) = 1 - \frac{\sum_{i=1}^{c}(y_i - \hat{y}_i)^2}{\sum_{i=1}^{c}(y_i - \bar{y})^2} \quad (4)$$

where $\bar{y}$ the average value of all $y_i$, and the R2 score closer to 1 means better performance of the regression model.

In some embodiments, the hyper-parameters of the machine learning model 350 can be adjusted based on the test results, to adapt the machine learning model 350 to a variety of different predicted scenarios, such as different storage disk vendors, different storage disk models, or the like, without modifying the code of the machine learning model 350. This adjustment can be done by an engineer only having storage technology background. In addition to the conventional hyper-parameters of the machine learning model 350 (such as the number of regression trees in a random forest), the length of the time window used to determine the change rate of the number of the recoverable errors can be used as a hyper-parameter of the machine learning model 350 to optimize machine learning model 350.

Some embodiments of the present disclosure have been simulated for a particular storage disk to verify the effectiveness of the machine learning model 350. Specifically, in the simulation, the type of the selected storage disk 110 is SAS-HDD, the time window of the training data 342 is from Jan. 1, 2018 to Jan. 31, 2018, and the time window of the testing data 344 is from Feb. 1, 2018 to Feb. 15, 2018. The recoverable errors to be predicted include recoverable errors in the BMS statistics and reallocation sector errors in the SMART statistics. The machine learning model 350 used in the simulation is a random forest regression model.

In the experimental setup of the simulation, the length of the time window as a hyper-parameter of the machine learning model 350 is set to 7, and the hyper-parameter the number of regression trees is set to 20. The random forest regression model is used to predict the number of recoverable errors to occur in the storage disk 110 after 7 days. In the evaluation step, when measuring various scores of the machine learning model 350, examples in which the number of the recoverable errors does not change within 7 days are excluded. This means that the simulation only focuses on the situation where the number of the recoverable errors increases, which can show how the machine learning model 350 predicts changes in the recoverable errors. The results of this simulation are as follows.

For the BMS recoverable errors, the number of available examples for the machine learning model 350 is 1184332, the explained variance score is 0.92, the median absolute error is 2.2, and the R2 score is 0.92. For the SMART reallocation sector errors, the number of available examples for the machine learning model 350 is 1309793, the explained variance score is 0.92, the median absolute error is 4.75, and the R2 score is 0.92. The simulation results show a very small difference between the predicted number of errors and the actual number of errors. In addition, the explained variance score is close to 1, which also indicates that the prediction result is accurate. Thus, the machine learning model 350 of the embodiments of the present disclosure, particularly the random forest regression model, can achieve good performance.

Referring back to FIG. 2, at 215, the controller 120 determines whether the predicted number of recoverable errors to occur in the storage disk 110 exceeds a threshold for identifying a slow disk. As noted above, a slow disk is closely related to the number of the recoverable errors occurred therein. Therefore, the administrator or user of the storage system 100 can reasonably set the threshold for identifying a slow disk according to a specific technical environment and design requirements or other factors. That is, if the predicted number exceeds the threshold, the storage disk 110 is considered to become a slow disk after the second period in the future. If the predicted number does not exceed the threshold, the storage disk 110 is considered to be a good or healthy storage disk after the second period.

At 220, if the predicted number exceeds the threshold for identifying a slow disk, the controller 120 performs an operation for handling a slow disk on the storage disk 110. For example, such an operation may be sending alarm information indicating that the storage disk 110 is to become a slow disk, such that the administrator of the storage system 100 can manually select a countermeasure for the storage disk 110, such as replacing the storage disk 110 or continuing to use the storage disk 110 for some time. As another example, such an operation may be directly labeling the storage disk 110 as a failed disk to trigger the storage disk 110 to be replaced. As a further example, such an operation may be reducing I/O access to the storage disk 110. Thus, if a request to read data from the storage disk 110 is received, the controller 120 can provide the data from another storage disk (for example, recover the data from other storage disks in a RAID group) to avoid reading storage disk 110. In other embodiments, the operations for handling a slow disk may include any operations that eliminate or mitigate the effects of the slow disk.

Figure 6:
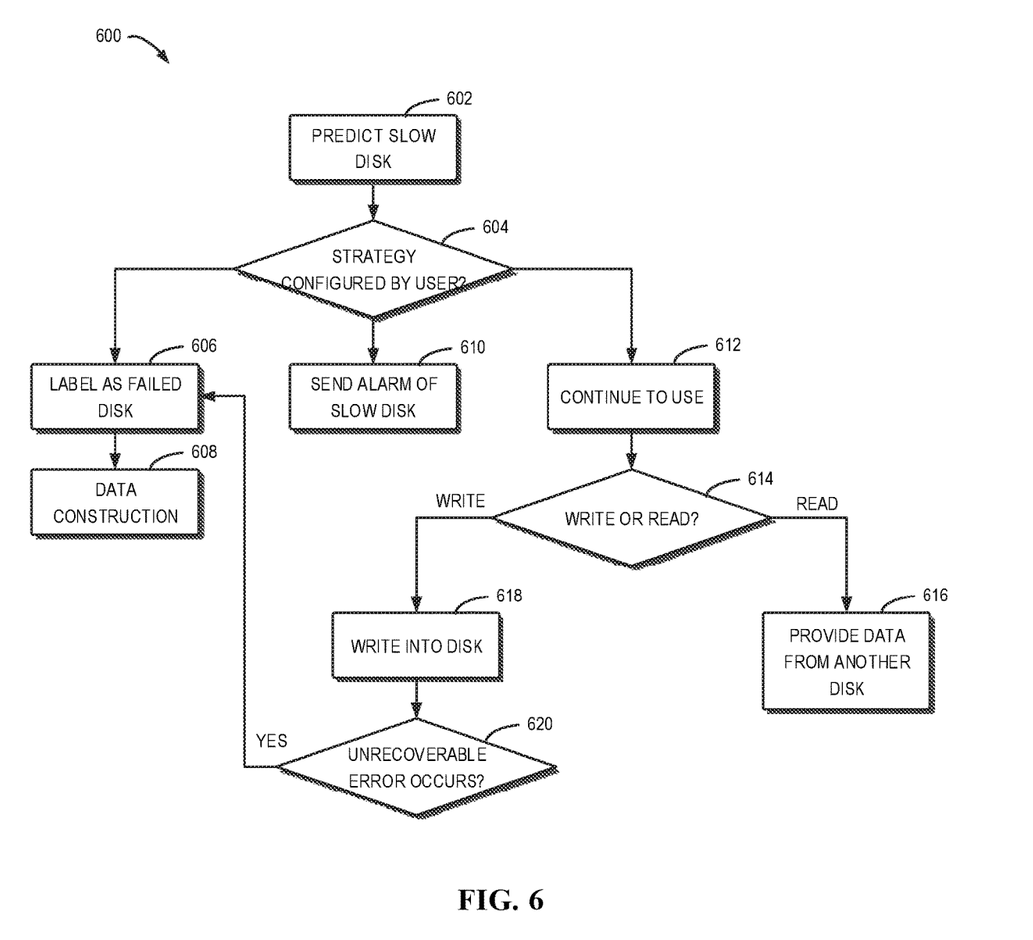
FIG. 6 shows a schematic flow chart of a handling operation process for a slow disk in accordance with an embodiment of the present disclosure.

In some embodiments, the controller 120 can perform different operations on the storage disk 110 based on strategies configured by a user. FIG. 6 shows a schematic flow chart of a handling operation process 600 for a slow disk in accordance with an embodiment of the present disclosure. In some embodiments, the process 600 may be implemented by the controller 120 in the storage system 100, such as by a processor or a processing unit of the controller 120, or by various functional modules of the controller 120. In other embodiments, the process 600 may also be implemented by a computing device independent of the storage system 100 or may be implemented by other units or modules in the storage system 100. For ease of discussion, the process 600 will be discussed below with reference to FIG. 1.

At 602, the controller 120 predicts that the storage disk 110 is to become a slow disk. For example, the controller 120 may utilize the trained machine learning model 350 to predict the number of recoverable errors to occur in the storage disk 110. Then, the controller 120 may compare the predicted number to a threshold number configured by the user for identifying a slow disk. If the predicted number exceeds the threshold number, the controller 120 can predict that the storage disk 110 is to become a slow disk. It should be understood that the threshold number used to identify a slow disk is configurable by the user, for example, the user can configure the threshold number via a configuration interface.

At 604, the controller 120 determines a handling strategy configured by the user for a slow disk. Under a first strategy, the process 600 proceeds to 606. At 606, the controller 120 labels the storage disk 110 predicted to become a slow disk as a failed disk to trigger the storage disk 110 to be replaced. Next, at 608, the controller 120 performs data reconstruction on the new substitute storage disk.

Under a second strategy, the process 600 proceeds to 610. At 610, the controller 120 issues alarm information indicating that the storage disk 110 is to become a slow disk. For example, the controller 120 can send the alarm information to the administrator of the storage disk 110 in various manners, such as displaying it on a display screen for displaying related information of the storage system 100, so that the administrator knows that the storage disk 110 is to become a slow disk. After receiving the alarm information, the administrator can manually determine what countermeasure is to take.

Under a third strategy, the process 600 proceeds to 612. At 612, the controller 120 determines to continue using the storage disk 110. In this case, the controller 120 can reduce I/O operations on the storage disk 110 to alleviate the stress on the storage disk 110. Specifically, at 614, the controller 120 determines whether an I/O operation on the storage disk 110 is a read operation or a write operation. If a read operation is determined, the process 600 proceeds to 616. At 616, the controller 120 can provide from another storage disk (for example, a backup disk or other storage disks in a RAID) the data to be read, to avoid reading the storage disk 110.

If a write operation is determined at 614, the process 600 proceeds to 618. At 618, the controller 120 writes into the storage disk 110 the data that needs to be written. At 620, the controller 120 can monitor whether an unrecoverable write error occurs in the storage disk 110. If an unrecoverable error occurs in the storage disk 110, the process 600 proceeds to 606 to trigger the storage disk 110 to be replaced and then data reconstruction is performed.

Figure 7:
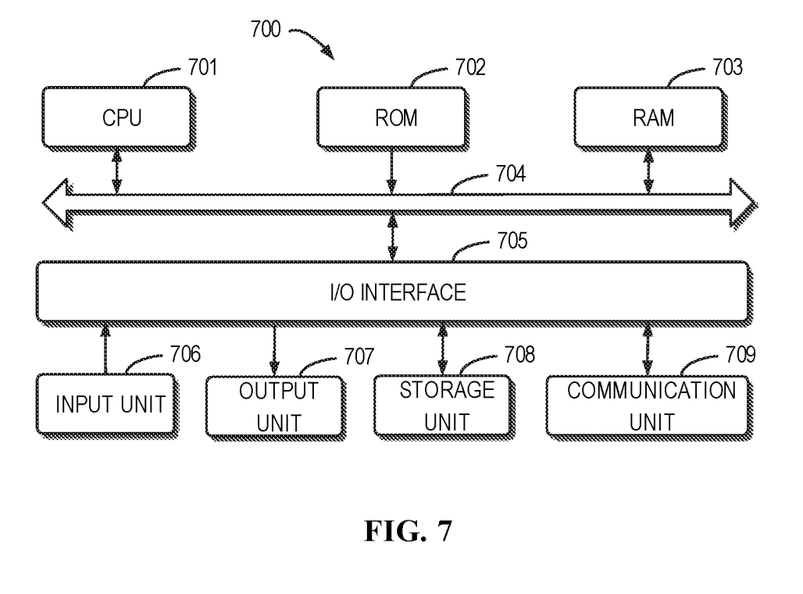
FIG. 7 shows a schematic block diagram of a device that can be used to implement an embodiment of the present disclosure.

FIG. 7 is a schematic block diagram of a device 700 that can be used to implement an embodiment of the present disclosure. As shown in FIG. 7, the device 700 comprises a central processing unit (CPU) 701 that may perform various appropriate actions and processing based on computer program instructions stored in a read-only memory (ROM) 702 or computer program instructions loaded from a storage section 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input 706 such as a keyboard, a mouse and the like; an output unit 707 including various kinds of displays and a loudspeaker, or the like; a memory unit 708 including a magnetic disk, an optical disk, and or the like; a communication unit 709 including a network card, a modem, and a wireless communication transceiver, or the like. The communication unit 709 allows the device 700 to exchange information/data with other devices through a computer network such as the Internet and/or various kinds of telecommunications networks.

Various processes and processing described above, for example, the method 200 and process 600, may be executed by the processing unit 701. For example, in some embodiments, the method 200 and process 600 may be implemented as a computer software program that is tangibly embodied on a machine readable medium, for example, the storage unit 708. In some embodiments, part or all of the computer programs may be loaded and/or mounted onto the device 700 via ROM 702 and/or communication unit 709. When the computer program is loaded to the RAM 703 and executed by the CPU 701, one or more steps of the method 200 or process 600 as described above may be executed.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The terms "first," "second," and the like may refer to different or identical objects. This article may also include other explicit and implicit definitions.

As used herein, the term "determining" encompasses a wide variety of actions. For example, "determining" can include computing, computing, processing, deriving, investigating, looking up (for example, looking up in a table, database, or another data structure), ascertaining, and the like. Further, "determining" can include receiving (for example, receiving information), accessing (for example, accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or a special purpose hardware. Ordinary skilled in the art may understand that the above method and system may be implemented with computer executable instructions and/or in processor-controlled code, for example, such code is provided on a carrier medium such as a magnetic disk, CD, or DVD-ROM, or a programmable memory such as a read-only memory (firmware), or a data bearer such as an optical or electronic signal bearer.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It should also be noted that features and functions of two or more devices in accordance with the present disclosure may be embodied in one device. Conversely, the features and functions of one of the devices described above can be further embodied into multiple devices.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A computer-implemented method, comprising:
obtaining historical data of recoverable errors that occurred in a storage disk during a first period;
determining, based on the historical data, a predicted number of recoverable errors to occur in the storage disk during a second period, wherein the first period having a same duration as that of the second period and wherein the second period is after the first period, and wherein determining the predicted number comprises:
determining, from the historical data, an attribute of the recoverable errors that occurred in the storage disk during the first period; and
determining the predicted number based on an association between the predicted number and the attribute;
in response to the predicted number exceeding a threshold, determining that the storage disk is a slow disk; and
performing, based on the determination, an operation on the storage disk.

2. The method of claim 1, wherein the association is determined based on historical data of the recoverable errors that occurred in the storage disk prior to the first period.

3. The method of claim 1, wherein the attribute comprises at least one of:
a number of the recoverable errors that occurred in the storage disk during a period having the duration,
a change rate of the number within a predetermined time window, and
a variance of the number within the predetermined time window.

4. The method of claim 1, wherein the association is determined by a machine learning model.

5. The method of claim 4, wherein a length of a time window for determining a change rate of a number of the recoverable errors is used as a hyper-parameter of the machine learning model to optimize the machine learning model.

6. The method of claim 4, wherein the machine learning model comprises a random forest regression model.

7. The method of claim 1, wherein obtaining the historical data comprises:
obtaining raw data including configuration information, runtime statistics, and event logs; and
extracting the historical data from the raw data.

8. The method of claim 1, wherein performing the operation comprises at least one of:
sending alarm information indicating that the storage disk is to become the slow disk;
labeling the storage disk as a failed disk to trigger replacement of the storage disk; and
in response to receiving a request for reading data from the storage disk, providing the data from another storage disk to avoid reading the storage disk.

9. An electronic device, comprising:
at least one processor; and
at least one memory storing computer program instructions, the at least one memory and the computer program instructions being configured, with the at least one processor, to cause the electronic device to:
obtaining historical data of recoverable errors that occurred in a storage disk during a first period;
determining, based on the historical data, a predicted number of recoverable errors to occur in the storage disk during a second period, wherein the first period has a same duration as that of the second period and wherein the second period is after the first period, and wherein determining the predicted number comprises:
determining, from the historical data, an attribute of the recoverable errors that occurred in the storage disk during the first period; and
determining the predicted number based on an association between the predicted number and the attribute;
in response to the predicted number exceeding a threshold, determining that the storage disk is a slow disk; and
performing, based on the determination, an operation on the storage disk.

10. The electronic device of claim 9, wherein the association is determined based on historical data of the recoverable errors that occurred in the storage disk prior to the first period.

11. The electronic device of claim 9, wherein the attribute comprises at least one of:
a number of the recoverable errors that occurred in the storage disk during a period having the duration,
a change rate of the number within a predetermined time window, and
a variance of the number within the predetermined time window.

12. The electronic device of claim 9, wherein the association is represented by a machine learning model.

13. The electronic device of claim 12, wherein a length of a time window for determining a change rate of a number of the recoverable errors is used as a hyper-parameter of the machine learning model to optimize the machine learning model.

14. The electronic device of claim 12, wherein the machine learning model comprises a random forest regression model.

15. The electronic device of claim 9, wherein the at least one memory and the computer program instructions are further configured, with the at least one processor, to cause the electronic device to:
obtain raw data including configuration information, runtime statistics, and event logs; and
extract the historical data from the raw data.

16. The electronic device of claim 9, wherein performing the operation comprises at least one of:
sending alarm information indicating that the storage disk is to become the slow disk;
labeling the storage disk as a failed disk to trigger replacement of the storage disk; and
in response to receiving a request for reading data from the storage disk, provide the data from another storage disk to avoid reading the storage disk.

17. A computer program product being tangibly stored on a non-volatile computer-readable medium and comprising machine-executable instructions which, when being executed, cause a machine to perform steps of a method, the method comprising:
obtaining historical data of recoverable errors that occurred in a storage disk during a first period;
determining, based on the historical data, a predicted number of recoverable errors to occur in the storage disk during a second period, wherein the first period having a same duration as that of the second period and wherein the second period is after the first period;

in response to the predicted number exceeding a threshold, determining that the storage disk is a slow disk; and performing, based on the determination, an operation on the storage disk.

18. The computer program product of claim 17, wherein performing the operation comprises at least one of:

sending alarm information indicating that the storage disk is to become the slow disk;

labeling the storage disk as a failed disk to trigger replacement of the storage disk; and in response to receiving a request for reading data from the storage disk, providing the data from another storage disk to avoid reading the storage disk.

* * * * *